US009067310B2

(12) United States Patent
Keskiniva et al.

(10) Patent No.: US 9,067,310 B2
(45) Date of Patent: Jun. 30, 2015

(54) SEALING ARRANGEMENT IN ROTATING CONTROL VALVE OF PRESSURE FLUID-OPERATED PERCUSSION DEVICE

(75) Inventors: Markku Keskiniva, Ylöjärvi (FI); Juha Piispanen, Ylinen (FI); Mauri Esko, Ikaalinen (FI)

(73) Assignee: Sandvik Mining and Construction Oy, Tampere (FI)

( * ) Notice: Subject to any disclaimer, the term of this patent is extended or adjusted under 35 U.S.C. 154(b) by 847 days.

(21) Appl. No.: 13/259,851

(22) PCT Filed: Mar. 24, 2010

(86) PCT No.: PCT/FI2010/050229
§ 371 (c)(1),
(2), (4) Date: Sep. 23, 2011

(87) PCT Pub. No.: WO2010/109071
PCT Pub. Date: Sep. 30, 2010

(65) Prior Publication Data

US 2012/0018657 A1 Jan. 26, 2012

(30) Foreign Application Priority Data

Mar. 26, 2009 (FI) ..................................... 20095317

(51) Int. Cl.
*B23B 45/00* (2006.01)
*B25D 9/22* (2006.01)

(52) U.S. Cl.
CPC ............ *B25D 9/22* (2013.01); *B25D 2250/365* (2013.01)

(58) Field of Classification Search
CPC ..... B25D 9/22; B25D 2250/365; B25D 21/00
USPC ............. 173/1–2, 13–17, 100–115, 124–129, 173/131–138, 141, 170, 184, 189, 193, 173/200–201, 204, 207, 218
See application file for complete search history.

(56) References Cited

U.S. PATENT DOCUMENTS 5,820,104 A 10/1998 Koyano et al.
7,290,622 B2 * 11/2007 Keskiniva et al. .............. 173/91
(Continued)

FOREIGN PATENT DOCUMENTS

CN 2011-26035 10/2008
FI 116513 12/2005
WO WO 2004073933 A1 * 9/2004 ............... B25D 9/22

OTHER PUBLICATIONS

Search Report and written opinion for PCT/FI2010/050229 dated Jun. 11, 2010.
(Continued)

*Primary Examiner* — Robert Long
(74) *Attorney, Agent, or Firm* — Morgan, Lewis & Bockius LLP

(57) ABSTRACT

The invention relates to a sealing arrangement in a rotating control valve of a pressure fluid-operated percussion device, to which percussion device a tool is mountable movable in its longitudinal direction, the percussion device containing a work chamber and a transmission piston mounted movable to compress the tool suddenly to generate a stress pulse to the tool, inlet and outlet channels for conducting pressure fluid to the percussion device and away from it, and a control valve having a rotating switch member with channels to connect inlet and outlet channels through the channels of the switch member to alternately conduct the pressure fluid through the channels to the work chamber and, correspondingly, away from the work chamber, and in the inlet channel of the pressure fluid at the switch member side end thereof at least one sealing sleeve for the purpose of sealing the inlet channel to the switch member. In the arrangement, the sealing sleeve is mounted obliquely to the surface of the switch member and the switch member side surface of the sealing sleeve is essentially in the shape of the switch member surface.

16 Claims, 3 Drawing Sheets

(56) References Cited

U.S. PATENT DOCUMENTS

| | | | | |
|---|---|---|---|---|
| 7,878,263 | B2 * | 2/2011 | Keskiniva et al. | 173/90 |
| 8,151,901 | B2 * | 4/2012 | Keskiniva et al. | 173/90 |
| 8,720,602 | B2 * | 5/2014 | Saf | 173/201 |
| 8,733,468 | B2 * | 5/2014 | Teipel et al. | 173/135 |
| 2006/0032649 | A1 * | 2/2006 | Keskiniva et al. | 173/213 |
| 2009/0266568 | A1 * | 10/2009 | Ahola et al. | 173/1 |
| 2014/0083540 | A1 * | 3/2014 | Colussi et al. | 137/625.11 |

OTHER PUBLICATIONS

European Search Report for Application No. 10755487.5 dated May 28, 2014.

* cited by examiner

SEALING ARRANGEMENT IN ROTATING CONTROL VALVE OF PRESSURE FLUID-OPERATED PERCUSSION DEVICE

CROSS REFERENCE TO RELATED APPLICATIONS

This application is the National Stage of International Application No. PCT/FI2010/050229, filed Mar. 24, 2010, and claims benefit of Finnish Application No. 20095317, filed Mar. 26, 2009, both of which are herein incorporated by reference in their entirety.

BACKGROUND OF THE INVENTION

The invention relates to a sealing arrangement in a rotating control valve of a pressure fluid-operated percussion device, to which percussion device a tool is mountable movable in its longitudinal direction relative to the frame of the percussion device, the percussion device containing a work chamber having a transmission piston mounted movable in the axial direction of the tool to compress the tool suddenly in its longitudinal direction by the pressure of the pressure fluid acting on the transmission piston to generate a stress pulse to the tool, and a control valve, to which inlet and outlet channels lead to conduct the pressure fluid to the percussion device and away from it and which has a rotatably mounted switch member with channels for connecting said inlet and outlet channels with the switch member to alternately conduct the pressure fluid through the channels to the work chamber and, correspondingly, to release the pressure fluid from the work chamber and in the inlet channel of the pressure fluid at the switch member side end thereof at least one sealing sleeve extending under the pressure of the pressure fluid toward the surface of the switch member for the purpose of sealing the inlet channel in relation to the switch member.

In pressure fluid-operated percussion devices, pressure fluid is fed into and removed from them through feed and discharge channels, respectively. To these feed and discharge channels pressure fluid hoses are typically connected to supply the pressure fluid into the feed pump and pressure fluid container.

For percussion operation, the feed and discharge of the pressure fluid in the percussion device is controlled with various control valves. The control valve may either move linearly or rotate. In rotating valves in particular, one practical problem is the sealing between the valve and channels, because all clearances cause leaks and leaks, in turn, cause a lower operating efficiency. Sealing also includes the problem that too tight a seal increases the rotation resistance of the valve and, thus, uses up the power of the device in vain and lowers its operating efficiency.

U.S. Pat. No. 7,290,622 discloses a solution in which separate sealing sleeves are used to seal the rotating control valve and the sealing sleeves are pushed against the surface of the control valve by the pressure of the pressure fluid so that no clearance remains between them. Adjusting the supply pressure of the sealing sleeve so as to keep the generated friction as small as possible is, to some extent, hard to do, even though a separate sealing sleeve structure is useful per se.

BRIEF DESCRIPTION OF THE INVENTION

It is an object of this invention to provide a sealing arrangement implemented by sealing sleeves, with which sealing is achieved reliably and, at the same time, the friction between the sealing sleeve and rotating valve is reduced from before without affecting the reliability of the sealing.

The sealing arrangement of the invention is characterized in that the sealing sleeve is mounted obliquely with respect to the surface of the switch member in the rotation direction thereof and the surface of the sealing sleeve on the switch member side essentially equals the shape of the surface of the switch member.

The idea of the invention is that in the inlet channel of the pressure fluid at the switch member side end, the sealing sleeve is positioned obliquely with respect to the direction of movement of the surface of the rotating switch member of the valve. The idea of an embodiment of the invention is that the sealing sleeve is positioned obliquely in such a manner that the switch member side end of the sealing sleeve is before the opposite end of the sealing sleeve in the rotation direction of the switch member.

The solution of the invention achieves that when the pressure fluid channel is only partially open, in which case the pressure of the pressure fluid acts on the sealing sleeve from the switch member side of the control valve and tries to push the sealing sleeve away, the friction of the surface opposite to the pressure slows down the movement of the sealing sleeve and, thus, the sealing sleeve remains better in place against the surface of the switch member. Further, the advantage of an embodiment of the invention is that as the switch member of the control valve rotates, the friction between it and the sealing sleeve tries to move the sealing sleeve with it in the direction of movement of the switch member, whereby the sealing sleeve in its oblique longitudinal direction extends away from the switch member and, thus, tries to detach from the surface of the switch member. In this situation, the friction and forces acting on the sealing sleeve become balanced, whereby the sealing sleeve presses against the switch member at a significantly smaller force than a sealing sleeve perpendicular to the switch member would.

BRIEF DESCRIPTION OF FIGURES

The invention will be described in greater detail in the attached drawings, in which.

DETAILED DESCRIPTION OF THE INVENTION

Figure 1:
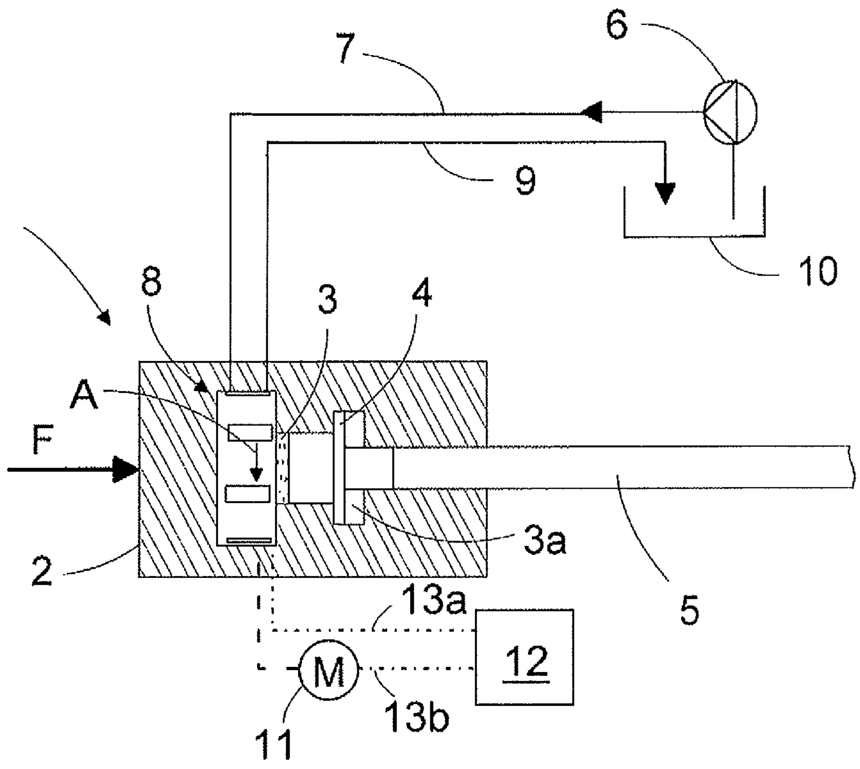
FIG. 1 is a schematic sectional view of a percussion device with a rotating control valve.

FIG. 1 is a schematic sectional view of a prior-art percussion device 1 with a frame 2, inside which there is a work chamber 3 and inside the work chamber 3 a transmission piston 4. The transmission piston 4 is coaxial with a tool 5 and they may move axially so that the transmission piston 4 touches the tool 5 directly at least when the stress pulse begins to form and during its formation or indirectly through a shank fastened to the tool and known per se. On the side of the transmission piston 4 opposite to the tool, there is a pressure surface facing the work chamber 3. For forming the stress pulse, pressure fluid is led to the work chamber 3 from a pressure source, such as a pump 6, along an inlet channel 7 through a control valve 8. The inlet channel 7 may either be a single channel or, on arrival at the control valve, it may branch into several channels, from which the pressure fluid flows simultaneously to the control valve. The control valve has a moving switch member 8*a* with one or, as shown in the figure, several channels, such as openings or grooves 8*b*. As the switch member 8*a* of the control valve 8 moves, the pressure fluid acts on the transmission piston 4 through the openings or grooves 8*b* and, correspondingly, as the switch member 8*a* continues to move, the pressure of the pressure fluid that acted on the transmission piston 4 discharges through a discharge channel 9. A stress pulse is formed when the pressure fluid pressure pushes the transmission piston 4 toward the tool 5 and through this compresses the tool 5 against the material being crushed. As it moves through the tool's 5 tip, such as a drill bit, to the material being crushed, such as stone, in a manner known per se, the stress pulse breaks the material. When the switch member of the control valve 8 prevents the pressure fluid from entering the percussion device and then allows the pressure fluid that acted on the transmission piston 4 to discharge through the outlet channel 9 to a pressure fluid container 10, the stress pulse stops, and the transmission piston 4 that has moved a short distance, only a few millimeters, toward the tool 5, is allowed to return to its initial position. This is repeated as the switch member 8*a* of the valve 8 moves and alternately switches the pressure to act on the transmission piston and then allows the pressure to discharge, whereby, as the switch member 8*a* moves continuously, a series of consecutive stress pulses is formed.

During the use of the percussion device, it is pushed in a manner known per se by using a feed force F toward the tool 5 and, at the same time, toward the material being crushed. To return the transmission piston 4, pressure medium may be supplied to the chamber 3*a* as necessary between stress pulses or the transmission piston may be returned by mechanical means, such as spring, or by pushing the percussion device with the feed force in the drilling direction, whereby the transmission piston moves backward in relation the percussion device, that is, to its initial position. The tool may be a part that is separate from the piston or integrated to it in a manner known per se.

In the case of FIG. 1, the control valve 8 has a rotatably moving switch member 8*a* coaxial with the tool 5, which is rotated around its axis in the direction of arrow A by using a suitable rotating mechanism, such as a motor 11, by means of power transmission shown schematically by dashed line. Alternatively, the switch member 8*a* is turned rotatably back and forth using a suitable mechanism. A rotatably moving switch member may also be mounted otherwise, for instance on the frame 2 on the side of the work chamber 3. Further, it is possible to use in all cases a control valve, whose switch member 8*a* has only one channel to conduct the pressure fluid toward the work chamber and, correspondingly, away from it. However, the switch member 8*a* of the control valve 8 preferably has several parallel channels.

FIG. 1 further shows a control unit 12 that may be connected to control the rotating speed of the control valve or the rate of movement of a reciprocating control valve by means of control channels or signal lines 13*a* and 13*b*. This type of adjustment may be implemented by several different techniques known per se by using desired parameters, such as drilling conditions, the hardness of the stone being crushed, for instance.

Figure 2:
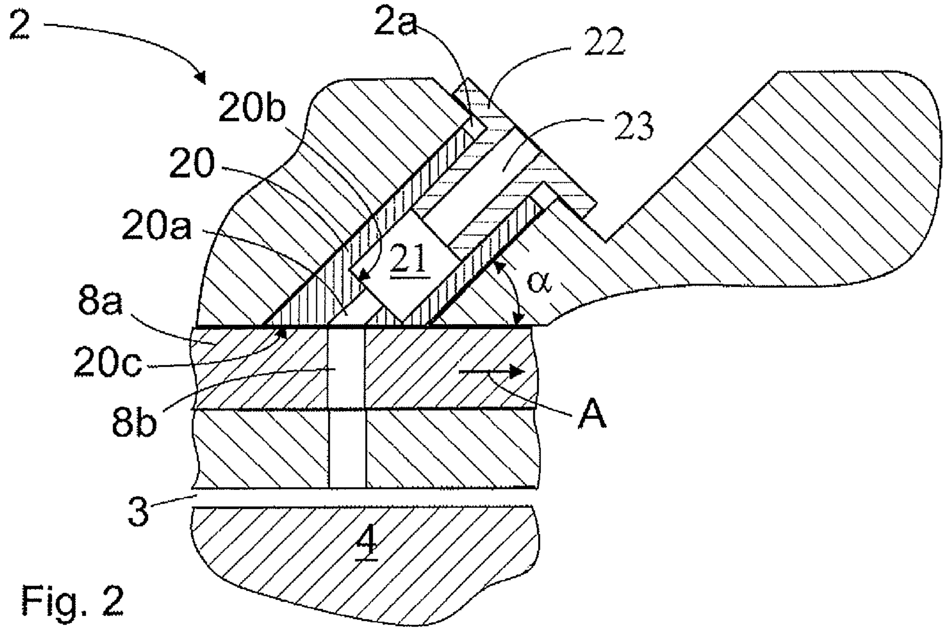
FIG. 2 is a schematic sectional view of a control valve and sealing sleeve in detail.

FIG. 2 is a detailed sectional view of a rotating control valve and a sealing arrangement of the invention. By way of example, it shows a disc-like rotating switch member 8*a* of a control valve which rotates in the direction shown by arrow A. The switch member 8*a* has openings 8*b* to allow pressure fluid through the sealing sleeve 20 and on to the piston 7 of the percussion device. At the switch member 8*a* side end that ends in the switch member 8*a*, the inlet channel 7 of the pressure fluid has a sealing sleeve 20.

As shown in FIG. 2, the sealing sleeve 20 is mounted in a space 2*a* at an oblique angle $\alpha$ relative to the switch member 8*a* so that it is inclined away from the switch member toward the direction of movement of the switch member. Thus, the end of the sealing sleeve 20 that is on the switch member 8*a* side is in the direction of movement of the switch member before the end of the sealing sleeve 20 that is further away from the switch member 8*a*. The sealing sleeve 20 is mounted slidable in its longitudinal direction in the space 2*a* formed in the frame 2 or part thereof and, at the outermost end of the sealing sleeve 20, there is a plug 22 that closes the space 21 and is connected stationary to the frame 2. The plug 22 has a through-channel 23, through which the pressure fluid is allowed to flow inside the sealing sleeve 20 and onward through a channel 20*a* inside the sealing sleeve 20.

The sealing sleeve has for the plug 22 a space 21 that is larger in cross-section than the channel 20*a* and has a pressure surface 20*b* on its switch member 8*a* side. The pressure p of the pressure fluid acts on the surface 20*b* and pushes the sealing sleeve 20 toward the switch member 8*a*, as a result of which the sealing sleeve 20 is pressed against the surface of the switch member 8*a*. The plug 22 is not absolutely necessary, and just the sealing sleeve 20 is enough when the sealing sleeve 20 and the inlet channel of the pressure fluid and the frame are designed suitably.

In the situation shown in FIG. 2, the channels 20*a* and 8*b* in the sealing sleeve 20 and switch member 8*a* are not fully in line, but the pressure of the pressure fluid acting in the channel 8*b* of the switch member 8*a* acts correspondingly on the surface 20*c* of the sealing sleeve 20 facing the switch member 8*a*. This tries to push the sealing sleeve 20 away from the surface of the switch member 8*a*. A pressure pulse acts on the sealing sleeve 20 especially when the pressure fluid channel 20*a* opens into the channel 8*b* of the switch member, or the connection between them is closed. In this situation, the friction between the sealing sleeve 20 and the surface of the space 2*a* prevents or slows down the movement of the sealing sleeve 20 away from the switch member 8*a* and, this way, makes the sealing sleeve 20 remain essentially against the surface of the switch member 8*a*.

As the switch member 8*a* rotates in the direction of arrow B, there is also friction between its surface and that of the sealing sleeve 20, which tries to push the sealing sleeve in the direction of movement of the switch member 8*a*. Due to the oblique position of the sealing sleeve 20, the effect of the friction force also generates a force vector in the longitudinal direction of the sealing sleeve 20, because the sealing sleeve 20 presses against the wall of the space 2*a* in the frame 2 and, thus, cannot move directly with the switch member 8*a*. As a result of this, the sealing sleeve 20 tries to move in its longitudinal direction away from the switch member 8*a* and, this way, the friction force and correspondingly the force provided by the pressure pushing the sealing sleeve 20 toward the switch member 8*a* become balanced, and the friction between the switch member 8*a* and sealing sleeve, and the power loss generated by it is smaller than it would be in a sealing sleeve that was perpendicular to the surface of the switch member 8*a*.

Figure 3:
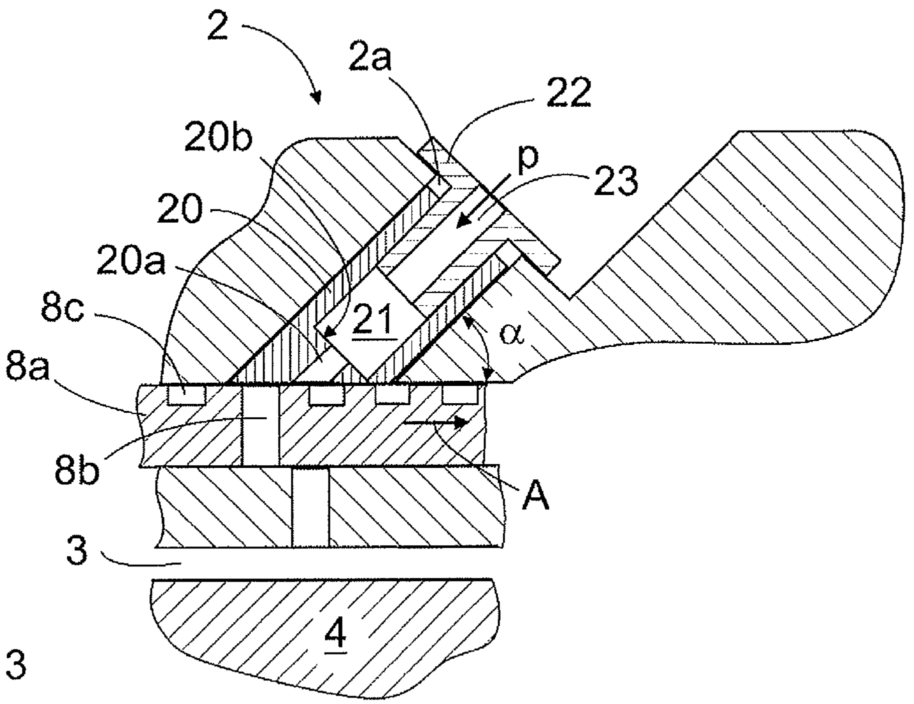
FIG. 3 is a schematic sectional view of an embodiment of the invention in detail.

FIG. 3 is a schematic sectional view of an embodiment of the invention in detail. In it, separate pressure pockets 8*c* are formed in the switch member 8*a* to reduce the friction and wear between the switch member 8*a* and sealing sleeve 20.

The pressure pockets 8$c$ are recesses formed in the switch member 8$a$ in the area between the channels 8$b$ on the surface of the switch member 8$a$ on the sealing sleeve 20 side. As they move at the location of the sealing sleeve 20 and past it, a similar pressure effect is created on the bottom surface of the sealing sleeve 20 as at the location of the channels 8$b$ when their connection to the pressure fluid channel 20$a$ running through the sealing sleeve opens or closes, whereby the sealing sleeve 20 tries to rise up away from the switch member 8$a$. This reduces the friction between the switch member 8$a$ and sealing sleeve 20 and, consequently, also the power consumption and wear.

Figure 4:
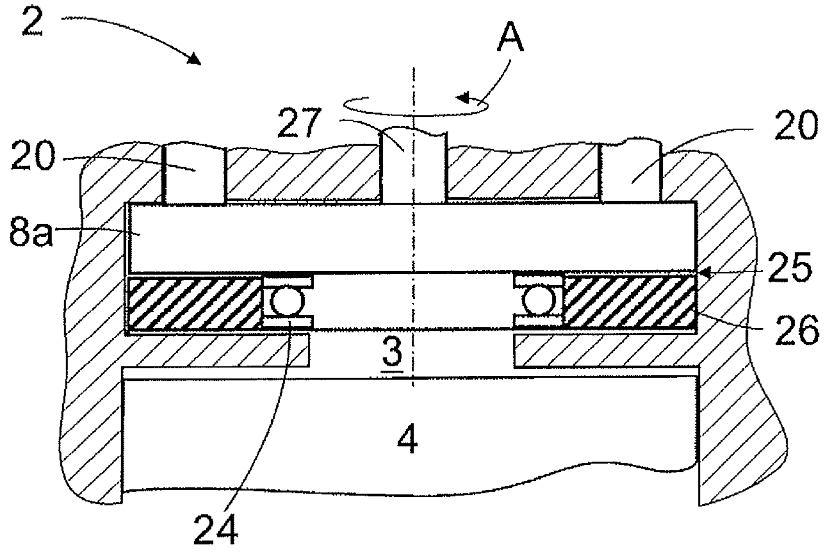
FIG. 4 is a schematic view of yet another embodiment of the invention.

FIG. 4 shows yet another embodiment of the invention. It shows how the rotating friction of the control valve 8 and thus also the power consumption may be reduced from before.

The inlet channel 7 of the pressure fluid, through which pressure fluid is fed to the switch member 8$a$ is furnished with sealing sleeves 20 in the manner described above, and the pressure p of the pressure fluid naturally acts on that side all the time.

The other side of the switch member 8$a$ is, in turn, on the work chamber 3 side of the transmission piston 4. The essential thing for sealing is that it is good on the inlet side of the pressure fluid, but this is not a very significant factor on the work chamber side, because that side is connected to the work chamber 3 all the time. This, in turn, is because the channel on the work chamber side is pressurized only momentarily, whereas the inlet side of the pressure fluid is pressurized all the time. Therefore, the switch member 8$a$ of the control valve 8 is on the work chamber 3 side fitted with a thrust bearing 24 so that there is a clearance 25 between the switch member 8$a$ and percussion device frame. The size of the clearance may be adjusted for instance by using between the frame 2 and switch member 8$a$ a separate clearance plate or ring 26 having a suitable thickness. The thrust bearing 24 is, in turn, in the pressure fluid all the time and thus obtains both its lubrication and cooling from it. The switch member 8$a$ is rotated in a manner known per se via an axle 27, for instance, by means of a suitable rotating device, such as a hydraulic or electric motor.

Figure 5:
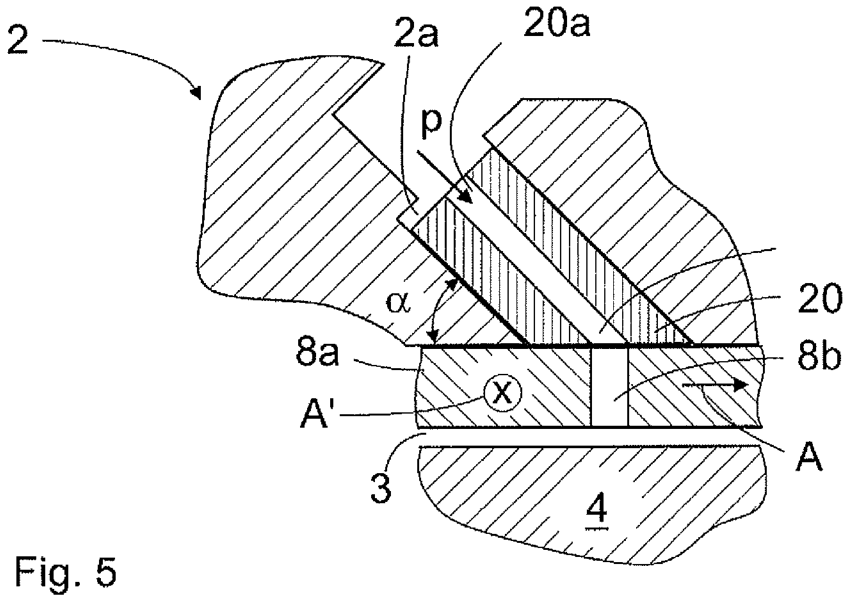
FIG. 5 is a schematic view of yet another embodiment of the invention.

FIG. 5 shows yet another embodiment of the invention. Herein, the obliqueness of the sealing sleeve 20 shown by arrow A is the opposite to what is shown in FIGS. 2 to 4. In this embodiment, the effect of the pressure fluid on the sealing sleeve 20 is similar to that in the other figures, but the lightening effect of the surfaces oblique in the direction of movement does not exist. Further, a cross A' in a circle indicates that the direction of movement of the switch member 8$a$ may be transverse to the plane of the figure or something between arrow A and cross A'. In these embodiments, too, the effect of the pressure and friction between the sealing sleeve 20 and walls of the space 2$a$ is the same.

Above, the invention is described in the specification and drawings by way of example only and it is in no way limited to the description. Different details of embodiments may be implemented in different ways and they may also be combined with each other. Thus, details in different figures, FIGS. 1 to 5, may be combined with each other in different manners to obtain the required embodiments in practice. The rotation of the switch member 8$a$ of the control valve 8 may be implemented in any manner known per se mechanically, electrically, pneumatically or hydraulically. The cross-section of the sealing sleeve may be round, oval, angular, etc. Similarly, the angle of obliqueness may be 45° or between 30° and 80°, for instance. Instead of a plate-like switch member 8$a$, the switch member may be cylindrical, conical, or spherical, as long as the shape of the end of the sealing member corresponds to the shape of the surface of the switch member. There may also be more than one sealing member.

The invention claimed is:

1. A sealing arrangement in a rotating control valve of a pressure fluid-operated percussion device, to which percussion device an elongated tool is mountable to be movable relative to the frame of the percussion device and in a longitudinal direction defined by a longitudinal axis of the elongated tool, the percussion device containing a work chamber having a transmission piston mounted movable in the axial direction of the tool to compress the tool suddenly in the longitudinal direction of the elongated tool by the pressure of the pressure fluid acting on the transmission piston to generate a stress pulse to the tool, and a control valve, to which inlet and outlet channels lead to conduct the pressure fluid to the percussion device and away from the percussion device and which has a rotatably mounted switch member with channels for connecting said inlet and outlet channels with the switch member to alternately conduct the pressure fluid through the channels to the work chamber and, correspondingly, to release the pressure fluid from the work chamber and in the inlet channel of the pressure fluid at the switch member side end thereof at least one sealing sleeve extending under the pressure of the pressure fluid toward the surface of the switch member for the purpose of sealing the inlet channel in relation to the switch member, wherein the sealing sleeve is mounted obliquely with respect to the surface of the switch member in the rotation direction thereof and the surface of the sealing sleeve on the switch member side essentially equals the shape of the surface of the switch member.

2. A sealing arrangement as claimed in claim 1, wherein the angle of obliqueness of the sealing sleeve is 45°.

3. A sealing arrangement as claimed in claim 1, wherein the switch member side end of the sealing sleeve is before the opposite end of the sealing sleeve in the rotation direction of the switch member.

4. A sealing arrangement as claimed in claim 1, wherein the end of the sealing sleeve that is away from the switch member is before the switch member side end of the sealing sleeve in the rotation direction of the switch member.

5. A sealing arrangement in a rotating control valve of a pressure fluid-operated percussion device, to which percussion device an elongated tool is mountable to be movable relative to the frame of the percussion device and in a longitudinal direction defined by a longitudinal axis of the elongated tool, the percussion device containing a work chamber having a transmission piston mounted movable in the axial direction of the tool to compress the tool suddenly in the longitudinal direction by the pressure of the pressure fluid acting on the transmission piston to generate a stress pulse to the tool, and a control valve, to which inlet and outlet channels lead to conduct the pressure fluid to the percussion device and away from the percussion device and which has a rotatably mounted switch member with channels for connecting said inlet and outlet channels with the switch member to alternately conduct the pressure fluid through the channels to the work chamber and, correspondingly, to release the pressure fluid from the work chamber and in the inlet channel of the pressure fluid at the switch member side end thereof at least one sealing sleeve extending under the pressure of the pressure fluid toward the surface of the switch member for the purpose of sealing the inlet channel in relation to the switch member, wherein the sealing sleeve is mounted obliquely with respect to the surface of the switch member in the rotation direction thereof and the surface of the sealing sleeve on the switch member side essentially equals the shape of the surface of the switch member, and wherein on the surface of the switch member between its channels, there is at least one recess passing the location of the sealing sleeve.

6. A sealing arrangement in a rotating control valve of a pressure fluid-operated percussion device, to which percussion device an elongated tool is mountable to be movable relative to the frame of the percussion device and in a longitudinal direction defined by a longitudinal axis of the elongated tool, the percussion device containing a work chamber having a transmission piston mounted movable in the axial direction of the tool to compress the tool suddenly in the longitudinal direction by the pressure of the pressure fluid acting on the transmission piston to generate a stress pulse to the tool, and a control valve, to which inlet and outlet channels lead to conduct the pressure fluid to the percussion device and away from the percussion device and which has a rotatably mounted switch member with channels for connecting said inlet and outlet channels with the switch member to alternately conduct the pressure fluid through the channels to the work chamber and, correspondingly, to release the pressure fluid from the work chamber and in the inlet channel of the pressure fluid at the switch member side end thereof at least one sealing sleeve extending under the pressure of the pressure fluid toward the surface of the switch member for the purpose of sealing the inlet channel in relation to the switch member, wherein the sealing sleeve is mounted obliquely with respect to the surface of the switch member in the rotation direction thereof and the surface of the sealing sleeve on the switch member side essentially equals the shape of the surface of the switch member, and wherein the sealing sleeve has on the pressure fluid inlet channel side a channel that is larger in diameter than the switch member side channel so that in the inlet direction of the pressure fluid a pressure surface is formed on which the pressure of the pressure fluid acts and generates a thrust force acting on the sealing sleeve in the direction of the switch member.

7. A sealing arrangement as claimed in claim 2, wherein the switch member side end of the sealing sleeve is before the opposite end of the sealing sleeve in the rotation direction of the switch member.

8. A sealing arrangement as claimed in claim 2, wherein the end of the sealing sleeve that is away from the switch member is before the switch member side end of the sealing sleeve in the rotation direction of the switch member.

9. A sealing arrangement as claimed in claim 2, wherein on the surface of the switch member between its channels, there is at least one recess passing the location of the sealing sleeve.

10. A sealing arrangement as claimed in claim 3, wherein on the surface of the switch member between its channels, there is at least one recess passing the location of the sealing sleeve.

11. A sealing arrangement as claimed in claim 4, wherein on the surface of the switch member between its channels, there is at least one recess passing the location of the sealing sleeve.

12. A sealing arrangement as claimed in claim 2, wherein the sealing sleeve has on the pressure fluid inlet channel side a channel that is larger in diameter than the switch member side channel so that in the inlet direction of the pressure fluid a pressure surface is formed on which the pressure of the pressure fluid acts and generates a thrust force acting on the sealing sleeve in the direction of the switch member.

13. A sealing arrangement as claimed in claim 3, wherein the sealing sleeve has on the pressure fluid inlet channel side a channel that is larger in diameter than the switch member side channel so that in the inlet direction of the pressure fluid a pressure surface is formed on which the pressure of the pressure fluid acts and generates a thrust force acting on the sealing sleeve in the direction of the switch member.

14. A sealing arrangement as claimed in claim 4, wherein the sealing sleeve has on the pressure fluid inlet channel side a channel that is larger in diameter than the switch member side channel so that in the inlet direction of the pressure fluid a pressure surface is formed on which the pressure of the pressure fluid acts and generates a thrust force acting on the sealing sleeve in the direction of the switch member.

15. A sealing arrangement as claimed in claim 5, wherein the sealing sleeve has on the pressure fluid inlet channel side a channel that is larger in diameter than the switch member side channel so that in the inlet direction of the pressure fluid a pressure surface is formed on which the pressure of the pressure fluid acts and generates a thrust force acting on the sealing sleeve in the direction of the switch member.

16. A sealing arrangement in a rotating control valve of a pressure fluid-operated percussion device, to which percussion device an elongated tool is mountable to be movable relative to the frame of the percussion device and in a longitudinal direction defined by a longitudinal axis of the elongated tool, the percussion device containing a work chamber having a transmission piston mounted movable in the axial direction of the tool to compress the tool suddenly in the longitudinal direction by the pressure of the pressure fluid acting on the transmission piston to generate a stress pulse to the tool, and a control valve, to which inlet and outlet channels lead to conduct the pressure fluid to the percussion device and away from the percussion device and which has a rotatably mounted switch member with channels for connecting said inlet and outlet channels with the switch member to alternately conduct the pressure fluid through the channels to the work chamber and, correspondingly, to release the pressure fluid from the work chamber and in the inlet channel of the pressure fluid at the switch member side end thereof at least one sealing sleeve extending under the pressure of the pressure fluid toward the surface of the switch member for the purpose of sealing the inlet channel in relation to the switch member, wherein the sealing sleeve is mounted obliquely with respect to the surface of the switch member in the rotation direction thereof and the surface of the sealing sleeve on the switch member side essentially equals the shape of the surface of the switch member to provide a reliable sealing at the same time reducing the friction between the sealing sleeve and the rotating control valve.

* * * * *